United States Patent

[11] 3,611,309

[72] Inventor Roy J. Zingg
Ames, Iowa
[21] Appl. No. 844,329
[22] Filed July 24, 1969
[45] Patented Oct. 5, 1971
[73] Assignee Iowa State University Research Foundation, Inc.
Ames, Iowa

[54] LOGICAL PROCESSING SYSTEM
13 Claims, 5 Drawing Figs.

[52] U.S. Cl. .......... 340/172.5
[51] Int. Cl. .......... G06f 7/00
[50] Field of Search .......... 340/172.5; 235/157

[56] References Cited

UNITED STATES PATENTS

| | | | |
|---|---|---|---|
| 3,037,194 | 5/1962 | Dirks .......... | 340/172.5 |
| 3,135,947 | 6/1964 | Grondin et al. .......... | 340/172.5 |
| 3,334,181 | 8/1967 | Bartlett et al. .......... | 340/172.5 |

*Primary Examiner*—Gareth D. Shaw
*Attorney*—Dawson, Tilton, Fallon & Lungmus

ABSTRACT: A number, M, of serial binary counters each having N bits are arranged so that individual bistable circuits of the counter define an M×N matrix. A number of shift registers, each adapted to temporarily store N+2 bits and to selectively shift a word up or down, are coupled via control circuitry to the counter matrix so that each counter is associated with a particular bit location in all of the registers for performing predetermined counting functions on that bit location. Control circuitry is provided for performing, in sequence, the steps: selectively shifting the contents of the registers, performing a predetermined logical function on the contents of the register, and then shifting the contents of the registers back to their original position. Any combinational Boolean function can be performed in parallel on the contents of the registers. Gating circuitry permits the selective transfer of the contents of any one counter in the matrix to a data bus, or the selective transfer of the contents of any one bit location of all of the counters to a data bus.

INVENTOR
ROY J. ZINGG
BY: Dawson, Tilton Fallon & Lungmus
ATTY'S

INVENTOR
ROY J. ZINGG
BY: Dawson, Tilton Fallon & Lungmus
ATT'Y'S

INVENTOR
ROY J. ZINGG
BY Dawson, Tilton, Fallon & Lungmus
ATTYS

LOGICAL PROCESSING SYSTEM

BACKGROUND AND SUMMARY

The present invention relates to a system for performing combinational logic functions on digital signals; and it has particular application to those processes normally required in the implementation of algorithms for pattern recognition —such as bit counting in parallel, thresholding, and the parallel conduction of logical functions. The term "parallel" used herein means the simultaneous operation on all corresponding digit or bit locations of different "bytes" or "words." The system may be incorporated in a general-purpose, programmable digital computer, or it may be a part of a special-purpose computer for a particular application.

Modern digital computers perform certain tasks, such as addition, subtraction, and multiplication, etc. with great speed and with substantial parallelism. Their great efficiency and speed may be credited primarily to the electronic components used and to the fact that these machines are organized or designed specifically with these tasks in mind. It is cumbersome and very much slower to perform certain other tasks, and of particular interest here are those processes normally required in the implementation of pattern recognition algorithms, such as bit counting in parallel, thresholding, and the parallel processing of logical functions. One of the principal advantages of the instant invention is that the performance of these latter operations (found to be advantageous in implementing pattern recognition algorithms) are carried out in parallel, thus affording a great efficiency and speed than is capable with an ordinary general-purpose digital computer.

The inventive system includes a plurality of serial binary counters together with a number of shift registers for temporary storage. The number of bits or digits in each shift register is greater by two than the number of bits in each byte (or "word") for which the inventive system is designed to process. Logic circuitry couples the output signals of the shift registers to the inputs of the counters. Control circuitry is provided for gating the information from the counter matrix in either a horizontal (that is, all of the bits of a given counter) or a vertical (that is, all of the bits of a particular location of each counter) to an information bus. The control circuitry also provides for the sequential shifting of the contents of the registers, performing a predetermined count or logic function on the shifted register contents, and then shifting the contents of the registers back to their original positions. Any combinational Boolean function can be performed on the contents of the registers, as will be made clear after the detailed description of the system.

Thus, the inventive system is advantageously used in the implementation of algorithms for applications in pattern recognition.

Other features and advantages of the present invention will be apparent to persons skilled in the art from the following detailed description of a performed embodiment accompanied by the attached drawing.

THE DRAWING

DETAILED DESCRIPTION

In describing one embodiment of the inventive system in detail, a choice was made as to the number of registers, the length (i.e. capacity) of the registers, etc. and it is to be understood that these numbers are somewhat arbitrary and for the purpose of illustrating and describing a particular example. In general, the number of counters, the length of the registers, the size of the data buses, and so on, will be determined by the number of bits desired to be processed in parallel. Further, the preferred number of registers will depend to some extent on the typical or average number of inputs to the Boolean expressions to be processed or, perhaps, on the magnitude and type of additional storage available. The preferred length of the counters will depend on the type of algorithm sought to be carried out. Persons skilled in the art will readily appreciate that the inventive system is independent of the quantities of the various system components described in the illustrated embodiment.

Figure 1:
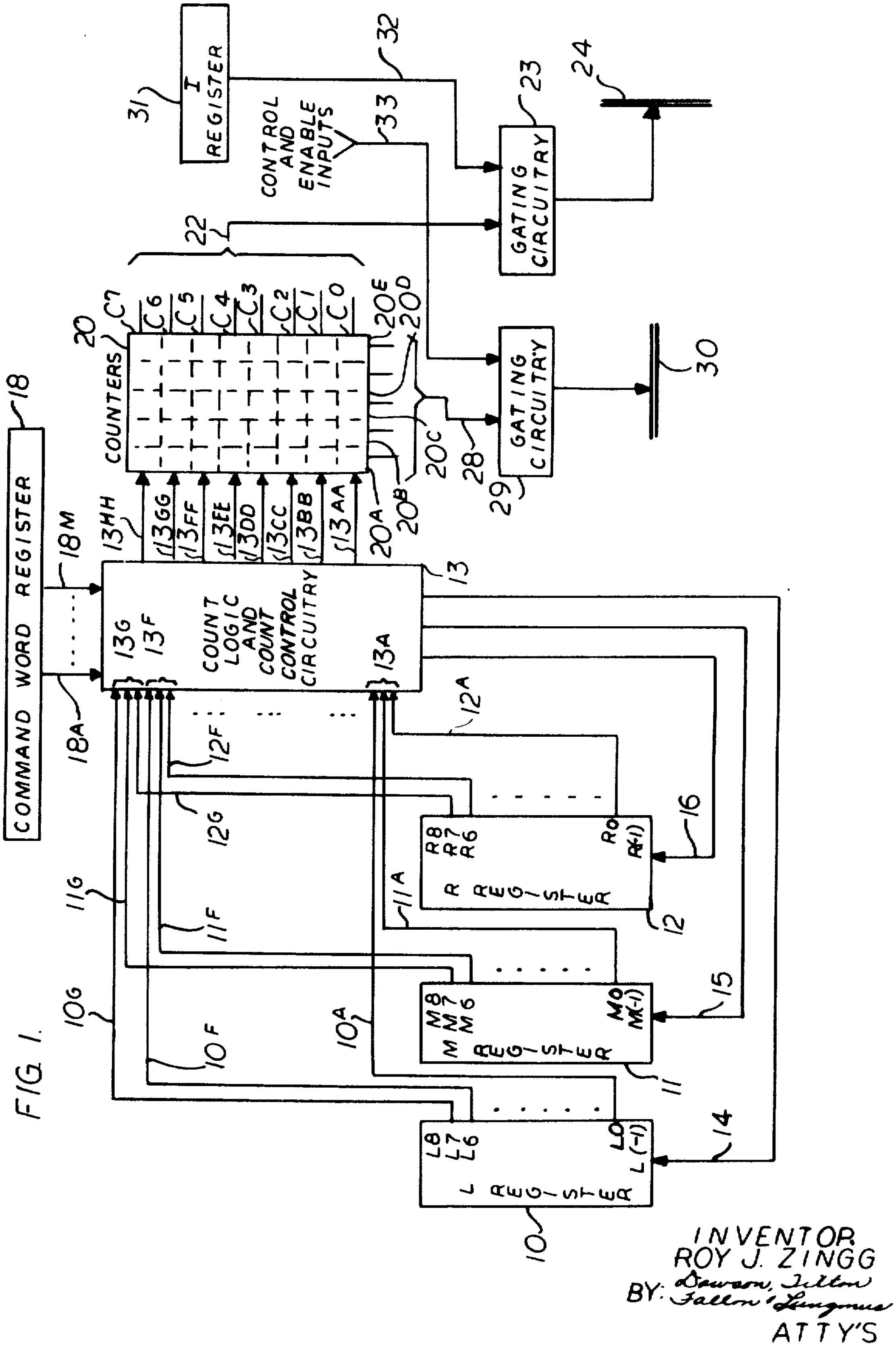
FIG. 1 is a functional block diagram of an overview of the inventive system.

Turning then to FIG. 1, it will be assumed that the bytes (or words) being processed are each eight bits long. Shift registers are designated by the blocks 10, 11 and 12; and these will be sometimes referred to respectively as the L register, the M register, and R register. Each of the registers 10–12 is for temporary storage and comprises a total of 10 bistable circuits or flip-flops with adjacent flip-flops connected in a conventional manner so that upon receipt of a shift pulse, each bit will be transferred either to a succeeding or a preceding bit location. That is, the shift registers 10–12 are of the type in which the information may be shifted "up" (since each register is extended in a vertical direction in FIG. 1) or down depending upon the shift pulse received. Because each of the registers 10–12 has 10 bits of temporary storage, an eight-bit byte may be loaded into any one of the registers and shifted in one direction, an operation performed, and then shifted in a reverse direction to return to its original position.

The 10 bit positions in FIG. 1 for the registers 10, 11 and 12 are numbered respectively from −1 through 8 with the normal eight-bit locations being 0 through 7. The bit locations are designated in the drawing by a capital letter indicative of the register together with a numeral indicative of the bit location. Thus, for the L register, the bit locations are L(−1) through L8.

Because it is not necessary for a full and clear appreciation and understanding of the present invention, the structure which loads the digital signals into the registers 10–12 is not illustrated; however, it is contemplated that the registers would be selectively loaded from any one of a number of data buses by means of gating control circuitry. Reference is made to my copending, co-owned application for Digital System for Controlling Signal Transfer Between Registers and Data Buses, Ser. No. 844,319, filed July 24, 1969 which sets forth specific circuitry for accomplishing this purpose.

The output signal contents of the bit positions L0–L7 of the register 10 are connected by means of lines (only three of which are shown for brevity and designated (10*a*, 10*f* and 10*g*) to a box denoted 13 and representing the count logic and count control circuitry. Similarly, the output signal contents of the bit position M0–M7 of the M register are connected by means of lines 11*a*–12*g* to the count logic and count control circuitry 13. As diagrammatically illustrated in the drawing, the count logic and count control circuitry 13 receives and processes each bit location of the registers 10–12 at separate locations, three of which are shown and designated 13*a*, 13*f*, and 13*g* respectively receiving the 0-, 10-, and 7-bit locations of the registers.

The count logic and count control circuitry 13 feeds the registers 10, 11 and 12 along lines 14, 15 and 16 respectively. The lines 14–16 couple the shift signals to the registers 10–12; and it will be each that in reality each of the lines 14–16 comprises two separate lines, one for transmitting a "shift up" pulse and the other for transmitting a "shift down" pulse. A command word register 18 feeds the count logic and count control circuitry 13 along lines 18*a*–18*m*, in a manner to be described in more detail presently. Another comment relative to the drawing is that although single lines are shown coupling the output signals from and input signals to bistable circuits, such bistables normally have both a true and a complementary output and a set and a reset input. Persons skilled in the art are capable of translating the diagrammatic illustrations to hardware without difficulty.

There are eight output leads, designated respectively 13*aa*–13*gg* and representative of the eight bit locations in a byte, which are fed to the inputs of a block 20, designated "-Counters." The counters 20 comprise eight serial binary counters, designated respectively C0–C7, and each associated with a different bit in a byte. The input lines 13*aa*–13*hh* feed respectively the first (or least significant) bit in the counters C0–C7. As is well known, each of the counters C0–C7 includes a number of individual bistable circuits adapted to generate output binary signals representative of the number of input pulses received. In the particular example illustrated, each of the counters has five bits. Thus, the counters 20 form a matrix having five columns (the number of bits in each counter) and eight rows (the number of bits in a byte being processed). For reasons which will be made clear below, each of the columns in the counter matrix 20 may be considered to be a separate register—that is, the least significant digit of each of the counters C0–C7 is designated register 20A, and successive such registers are designated respectively 20B, 20C, 20D, and 20E.

The output signals of the counters C0–C7 are coupled via lines 22 to gating circuitry 23. The outputs of the gating circuitry 23 are coupled to a data bus 24. Similarly, the outputs of the registers 20A–20E are coupled along separate channels (diagrammatically designated by the line 28) to gating circuitry 29 which feeds a bus 30 and is controlled by Control and Enable Inputs along lines diagrammatically shown at 33. Gating circuits may be provided to gate to multiple buses or several of the registers 20A–20E may be conjunctively coupled onto one selected bus to perform a logical "or" function on the contents.

A register 31 (sometimes referred to as the I register) feeds the gating circuitry 23 along lines 32. The data bus 24 comprises eight separate signal lines (one for each digit location in a byte); whereas the data bus 30 comprises five separate signal lines (one for each counter digit). Alternatively, the data buses 24 and 30 may be identical, in which case if the contents of the vertical registers of the counter matrix are gated to the data bus, three of the lines are not used. It is considered to be an important advantage of the present invention to be able to selectively gate the contents of any particular counter or the contents of any of the digit location of all counters (represented by an associated one of the registers 20A–20E) to a data bus for reasons to be explained below.

Figures 2, 3:
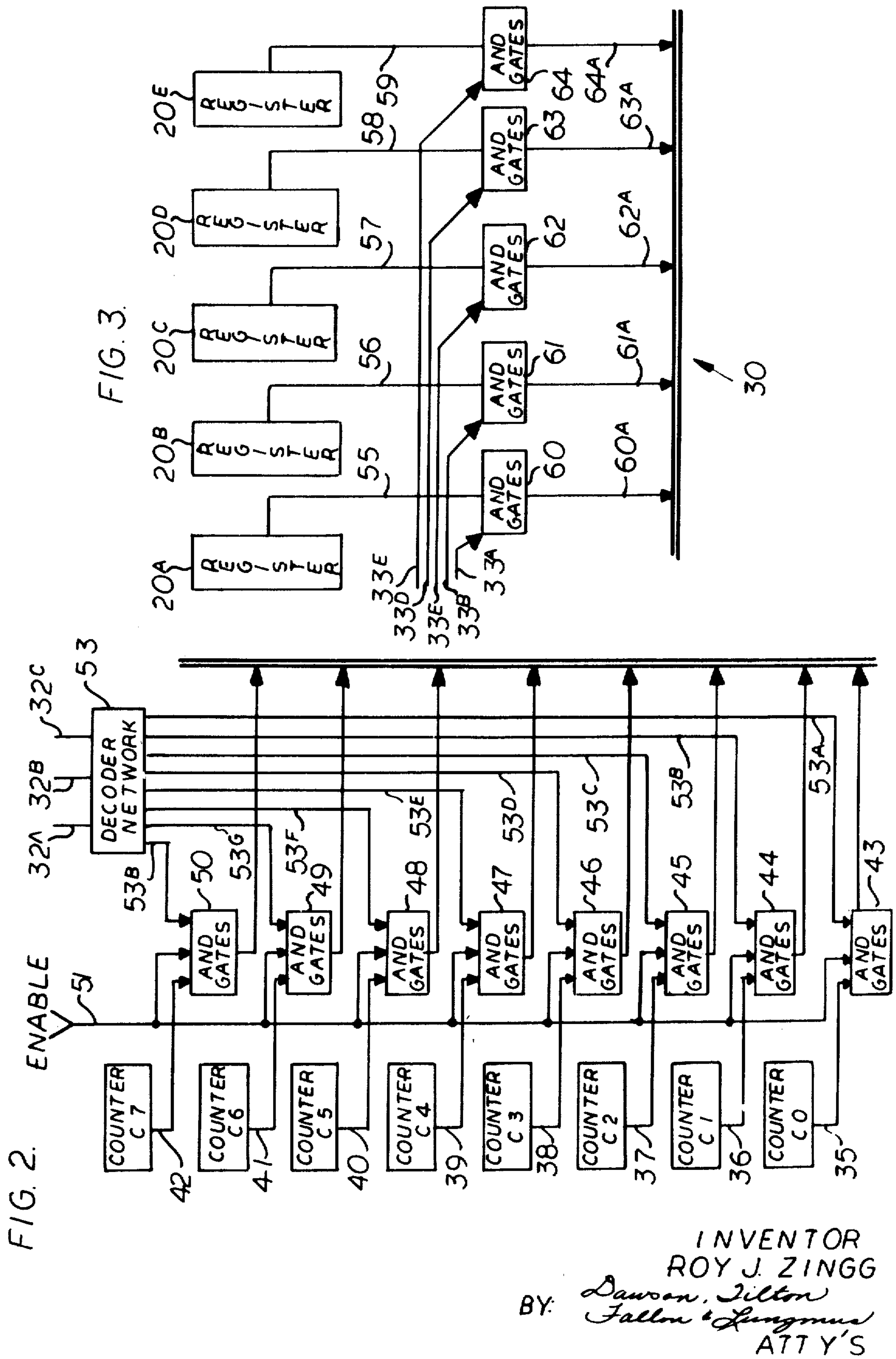
FIG. 2 is a more detailed functional block diagram of the "horizontal" gating of the information in the counter matrix to a data bus.
FIG. 3 is a functional block diagram, in more detail than FIG. 1, of the "vertical" gating of information from the counter matrix to a data bus.

Turning now to FIG. 2, the circuitry for gating the output signal contents of the counters C0–C7 will now be described. In FIG. 2, the counters C0–C7 are diagrammatically shown as separate counters, and each counter has five output lines, designated respectively by the lines 35–42. The output lines 35–42 are connected to the signal inputs of AND gate means diagrammatically shown by the blocks 43–50. Each of the AND gate means 43–50, in turn, comprises five conventional AND gates, one associated with each of the output lines of the register that feeds it; and each of these five AND gates has a first signal input, a second signal input, and "enable" input, and an output terminal. The enable input of all of the five individual AND gates in each of the AND gate means 43–50 are enabled by a common input or strobe pulse coupled along a line 51. A decoder network 53 receives three of the output leads, designated 32*a*, 32*b*, and 32*c* from the I register 31 to generate a signal on one of its seven output leads, designated respectively 53 *a*–53*f* depending upon the signal contents of the information stored in the I register. For example, if the signal contents of the I register on the leads 32*a*–32*c* are 001, the output line 53*a* may be energized whereas the other output lines 53*b*–53*f* are not. The output line 53*a* is coupled to the second signal input of each of the five AND gates in AND gate means 53. Similarly, the remaining output leads of the decoder network 53 are coupled respectively to the second signal inputs of each of the AND gates in the AND gate means 44–50. The five output terminals of each of the five AND gate means 43–50 are coupled to one of the five signal leads comprising the data bus 30.

Thus, the I register determines which of the counters is to be coupled to the data bus 24; and when the enable pulse is present on the line 51, the outputs from the selected counter will thereupon be transferred to the data bus 24 through the agency of its associated AND gate means.

Turning now to FIG. 3, the circuitry for gating the output signal contents of the "vertical" registers 20A–20E of the counter matrix to the data bus 30 will be described. In FIG. 3, the registers 20A–20E are shown as separate blocks; and each register has eight output lines, one for each bit. These output lines of the registers are diagrammatically shown as the lines 55–59 respectively. Each of the sets of output lines 55–59 is coupled to an associated AND gate means denoted 60–64 respectively. The AND gate means 60–64 are similar to those already described. The AND gate means 60 includes eight separate AND gates, each having a first signal input lead connected to one of the output leads 55 of the register 20A, an enable lead, and an output lead. Since the structure, operation, and interconnections of each of the AND gate means 60–64 is similar with respect to its associated register, only the AND gate means 60 will need be described in greater detail here.

The AND gate means 60 comprises eight separate AND gates, the signal input terminal of each gate being connected respectively to one of the eight output leads 55 of the register 20A. The enable lead of all of the eight AND gates in AND gate means 60 are energized by a line 33*a* from the Control and Enable Inputs. Similar control inputs, designated 33*b*–33*e* in FIG. 3 are coupled respectively to the enable leads of each of the AND gates in AND gate means 61–64.

Each of the AND gate means 60–64 has eight separate output lines (each block being representative of eight separate AND gates). The sets of eight lines are diagrammatically illustrated as the lines 60*a*–64*a*. The information bus 30 also has eight separate signal lines, one connected to a separate one of each of the sets of signal lines 60*a*–64*a* from the AND gates. Thus, responsive to the signals appearing on the lines 33*a*–33*e*, output signals of a selected one (or more) of the registers 20A–20E will be transferred to the data bus 30 when the enable pulse appears on the proper enable lead.

Figures 4, 5:
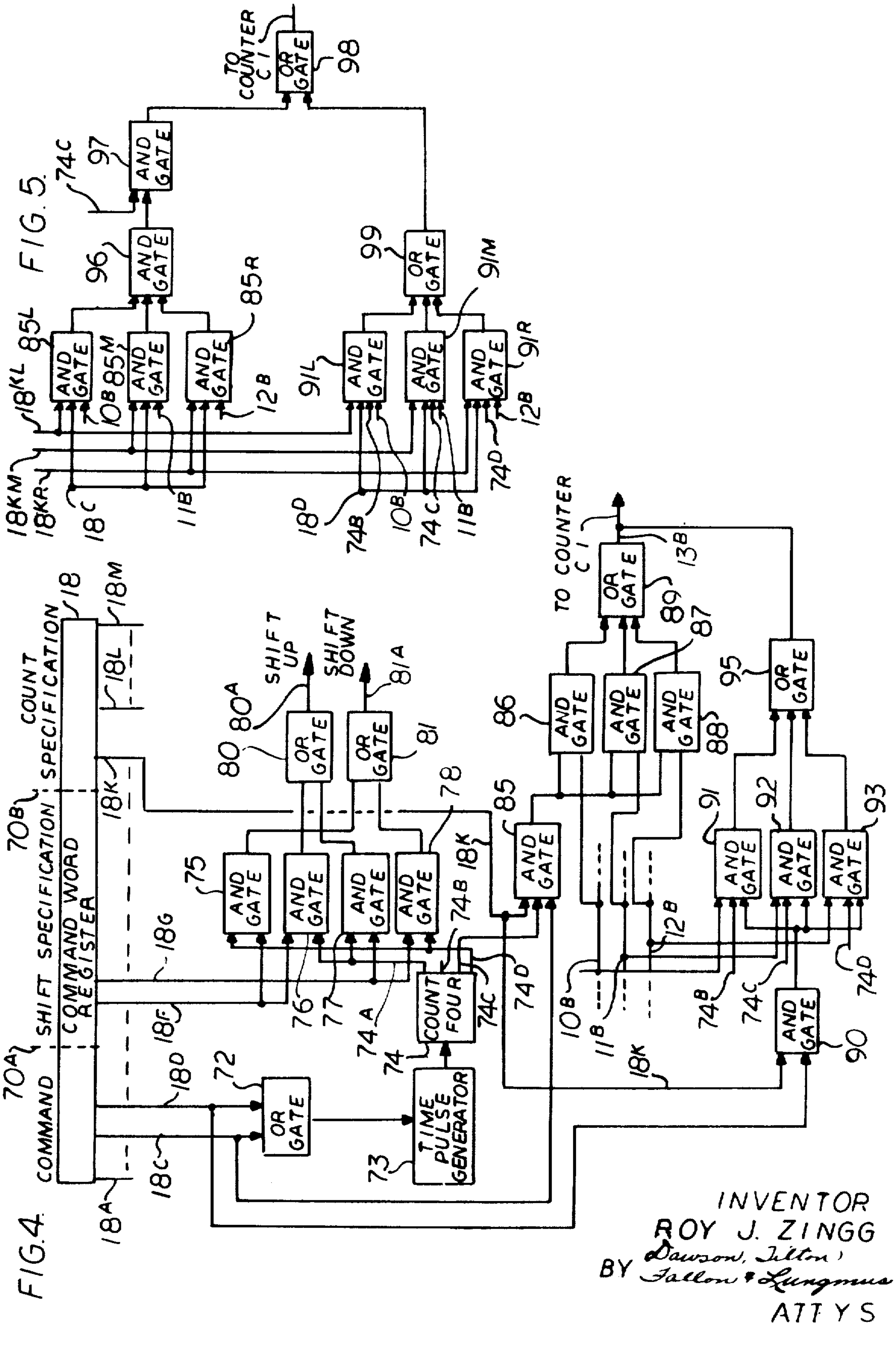
FIG. 4 is a logic diagram of a portion of the control circuitry of FIG. 1.
FIG. 5 is a modification of the circuitry of FIG. 4.

Turning now to FIG. 4, portions of the count logic and count control circuitry which will enhance an understanding of the use of the inventive system in carrying out combinational and counting functions will be described. However, since much of the circuitry is redundant (the same operations being performed on all of the bits in the three registers 10–12) much of the circuitry is eliminated—that which is shown being deemed sufficient to persons skilled in the art for an understanding of the invention. As already mentioned, the command word register 18 has a plurality of output leads 18*a*–18*m* ; and the ordering of these leads is not important and the designation 18*m* represents an indefinite number of leads since the number depends upon system requirements.

For purposes here, the command word signals temporarily stored in the register 18 may be broken down into three separate portions separated by the dashed lines 70*a* and 70*b* in the drawing. The first portion of a command word designated the command to be performed, the second portion of a command word designates a SHIFT specification indicating to the registers 10–12 a desired shift direction (up or down), and the third portion of a command word designates a COUNT specification for each register. For simplicity, circuitry for carrying out a SHIFT specification and a COUNT specification for two sets of operations will be detailed. In the first operation, circuitry will be described for performing a shift operation on the L register and a count specification on the second bit of each of the registers 10–12. It will be appreciated that similar circuitry for carrying out a SHIFT specification on each of the other two registers is included but not shown, and that circuitry for carrying out the COUNT specification for all of the other bit locations in the registers is also included but not shown.

There are four commands which have been found to be of great advantage in implementing pattern recognition algorithms with the inventive system; and the first one if a "Shift And Count Logical" or SCL, for short. This command consists of three steps performed in sequence: (1) the contents of each of the registers 10–12 are shifted either one place up, one place down, or not at all according to a SHIFT specification in the command word for each of the separate registers; (2) next, a counting function, as defined by the COUNT specification in the command word, is performed for each bit location of each register; and (3) the contents of the registers are then shifted back to their original positions.

In the SCL command, the COUNT specification comprises two separate bits in the command word which may specify a count (i.e. advance of the counter contents) if the register bit is 0, or a count if the register bit is a 1, or an unconditional count, that is, a count whether the register bit is a 0 or a 1. The outcomes of the comparisons of the COUNT specifications and the register bits for the three registers at each bit level are conjunctively joined so a particular counter may be incremented by 1 or not incremented at all.

A second command, called the "Shift And Count Successively" command, or SCS for short, consists of the same three steps as the SCL command; however, the output signals of the comparisons are not conjunctively joined, but they are applied to the counters in succession for obtaining a numerical count. Thus, with the SCS command, the counters may be incremented by 0, 1, 2, or 3, depending upon the information in the registers.

A third command, the "Shift Registers" or SR, command permits the permanent shifting of the signal contents of any one of the registers relative to the other. A final command, the "Increment And Test I Register" or ITI command, permits the programming of a loop in which the contents of the right counters are placed on the information bus, one counter at a time and in sequence by incrementing the I register by counts of one. When the I register returns to its original state, the next command is taken in sequence. Circuitry for these latter commands is straightforward and need not be detailed here.

Turning then to FIG. 4, it will be assumed that the line 18*c* will carry a signal if an SCL command is loaded in the command word register 18. It will further be assumed that the lines 18*f* and 18*g* carry the information defining a desired shift specification, and that the lines 18*k* and 18*L* carry signals defining a desired COUNT specification. The SHIFT specification is defined such that if the line 18*f* has a 1, the contents of the L register are to be shifted up first (i.e. prior to execution of the COUNT specification), whereas if the line 18*g* has a 1, the contents of the L register are to be shifted down first. If neither line has a 1, there is no shifting of the L register.

The line 18*c* is connected to one input of an OR gate 72 which triggers a time pulse generator 73 which generates a train of at least four pulses. The generator 73 feeds a counter circuit 74 to sequentially count the first four pulses of the generator 73 and to generate successive strobe pulses on the output lines 74*a*, 74*b*, 74*c*, and 74*d*. The line 74*a* of the counter circuit 74 is connected to a first signal input of AND gates 76 and 77, the output lead 74*d* is connected to first signal input leads of AND gates 75 and 78. The line 18*f* is connected to the second signal inputs of the AND gates 75 and 76, and the line 18*g* is connected to the second signal inputs of the AND gate 78. The output signals of the AND gates 76 and 77 are connected by means of an OR gate 80 to a lead 80*a* which shifts the contents of the L register up. The outputs of the AND gates 75 and 78 are connected by means of an OR gate 81 to a lead 81*a* which shifts the contents of the L register down. Thus, if 1 is present on line 18*f*, upon the first count, the AND gate 76 will transmit a signal to the OR gate 80 and shift the contents of the L register up. Upon the generation of the fourth count, the line 74*d* will be energized and the AND gate 75 enabled to transmit a pulse through the OR gate 81 to shift the contents of the L register down. Conversely, if a 1 is present in the line 18*g*, when the first count is present on line 74*a*, the AND gate 78 will be enabled to transmit a pulse through the OR gate 81 to shift the contents of the L register down; and subsequently when the lead 74*d* is energized, the AND gate 77 will be enabled to thereby transmit a pulse through the OR gate 80 to shift the contents of the L register up.

The third sequential output of the count four circuit 74 is fed via line 74*c* to one input of an AND gate 85. Two other inputs to the AND gate 85 are connected respectively to the line 18*k* and the line 18*c*. Thus, the AND gate 85 transmits an output signal upon the generation of the third sequential pulse from the time pulse generator 83 only when the command word calls for an SCL command and the count specification calls for the counting of ones. The output of the AND gate is directly connected to a first signal input of three separate AND gates designated respectively 86, 87 and 88. The second signal inputs of these AND gates 86–88 are directly connected respectively to the lines 10*b*, 11*b*, and 12*b* (the outputs of the second digit location of the L, M, and R registers). The output leads of the AND gates 86–88 are coupled to an OR circuit 89, the output of which feeds the input of counter C1 along line 13*b* (refer to FIG. 1). Circuitry similar to that shown for the AND gates 86–88 that uses the complementary outputs of the flip-flops of registers 10, 11, and 12 are included for the case in which it is desired to count zeros, in which case a signal will be present on line 18L. Finally, the output of that circuitry together with the output of the AND gate 89 will be conjunctively joined together for the case in which it is desired to count both zeros and ones, the strobing pulse there being generated by an AND gate sensing a 1 on both lines 18*k* and 18L. The circuitry just described advances a counter if a 1 is present on any of the digit lines for the registers 10–12. The circuitry of FIG. 5 permits selection for counting only with respect to predetermined or desired registers and that circuitry will be described after the circuitry for implementing an SCS command is discussed.

For the case of an SCS command, there will also be a SHIFT specification and a COUNT specification. The circuitry for implementing a SHIFT specification may be the same as that shown for the case of an SCS command; and is not shown. It will be assumed that a signal will be present on the line 18*d* if an SCS command is called for. Again, assuming that the COUNT specification calls for counting ones, the line 18*k* and the line 18*d* are coupled to the inputs of an AND gate 90. The output of the AND gate 90 is fed to three separate AND gates 91, 92, and 93, each being a three-input gate. The other two inputs of the AND gate 91 are received respectively from the lines 10*b* and the lines 74*b* representative of the second sequential step output of the count four circuit 74. The other two inputs of the AND gate 92 are received respectively from the digit line 11*b* and the third sequential output of the count four circuit 74*c*. The other two inputs of the AND gate 93 are received respectively from the digit line 12*b* and the fourth sequential output 74*d* of the count four circuit.

The outputs of the AND gates 91, 92 and 93 are fed to the inputs of an OR gate 95, the output of which is coupled to line 13*b*. Thus, when an SCS command is present in the command word register 18, the line 18*d* will energize the time pulse generator 72 to carry out the shifting specification and to sequentially energize the four output leads of the count four circuit 74. Simultaneously, the AND gate 90 will be energized; and as the AND gates 91–93 are energized, sequential outputs will be generated at the output of the OR gate 95 for the presence of ones on the digit lines 10*b*, 11*b*, and 12*b*.

The circuitry of FIG. 4 will, in the event of a command word calling for an SCL command, count (i.e. advance register C1) a single count for each "one" present on any one of the digit lines 10*b*, 11*b*, or 12*b*. Similarly, the illustrated circuitry, in the event the command word calls for an SCS command, advance the counter each time a one is present on any one of the lines 10*b*, 11*b*, or 12*b*. In some applications it is desirable to be able to count only for selected ones of the registers L, M or R. Circuitry for implementing this type of selective operation is shown in FIG. 5 wherein, again, it will be assumed that line 18*c* will be energized if it is desired to execute an SCL command and line 18*d* will be energized if it is desired to execute an SVS command.

In this embodiment, the previous line 18*k* takes the form of three separate lines, identified respectively as 18*k*L, 18*K*M, and 18*k*R, the last letter designating an associated one of the registers 10–12. There will, of course, be three separate lines for counting zeros, but that circuitry will again be similar to the circuitry presently to be described for operating on the complementary signals of the registers.

The previously identified AND gate means 85 herein takes the form of three separate AND gate means and they are designated respectively 85L, 85M, and 85R. Each of these three AND gates has three signal inputs, the and gate 85L receives inputs from the COUNT specification line 18*k*L, the command signal line 18*c*, and the digit signal line 10*b*. Thus, when suitably strobed, the AND gate 85L will generate an output signal only if an SCL command was called for and there is a 1 in the second digit location of the L register 10. Similarly, the AND gate 85M receives inputs from the count specification line 18*k*M, the command signal line 18*c*, and the digit line 11*b*. The AND gate 85R receives signal inputs from the count specification line 18*k*R, the command word signal line 18*c*, and the digit line 12*b*. The output of the AND gates 85L, 85M, and 85R are fed to the input lines of an OR gate 96, the output of which feeds an AND gate 97. The AND gate 97 is enabled by a strobe signal present on line 74*c* of the count four circuit 74. The output of AND gate 97 feeds an OR gate 98 which, in turn, feeds the counter C1. Thus, the circuitry just described permits the selective implementation of an SCL command together with the selective counting of the ones (or zeros) in preselected ones of the registers.

In order to implement an SCS command which is selective in counting ones (or zeros) from only predetermined ones of the digit lines 10*b*–12*b*, each of the AND gates 91–93 of the embodiment of FIG. 4 takes the form of three separate AND gates, each energized by a different one of the lines 18*k*L, 18*K*M, or 18*k*R. The three AND gates taking the place of AND gate 91 are designated 91L, 91M, and 91R in FIG. 5, the letter designating the register with which it is associated. Each of these AND gates has four inputs. The AND gate 91 receives one input from the line 18*k*L, a second input from the command signal line 18*D*, a third input from the output line 74*B* of the count four circuit 74, and a final input from the digit line 10*b*. The AND gate 91M receives a first input from the line 18*k*M, a second input from the command signal line 18*d*, a third input from the third sequential signal lead 74*c* of the count four circuit 74, and a fourth input from the digit line 11*b*. The AND gate circuit 91R receives a first input from the count specification line 18*k*R, a second input from the command signal line 18*d*, a third input from the fourth sequential signal lead of the count four circuit 74*d*, and a fourth input from the digit line 12*b*.

Thus, the AND gate 91L will generate an output signal when an SCS command is called for provided that it is desired to count ones in the digit locations of the L register (this being indicated by the presence of a signal on the line 18*k*L). The output signal will, of course, be generated when the strobe pulse appears on the line 74*b*. The outputs of each of the AND gates 91L, 91M, and 91R are fed to the inputs of an OR gate 99 which, in turn, drives a second input of the OR gate 98 to feed counter C1.

An extension of the circuitry illustrated in FIG. 5 may be used for those applications in which it is desired to executed a specific command relative to preselected ones of the registers L, M, or R.

Any combinational Boolean function can be generated from the bit-by-bit "OR" and the "Invert." The "OR" function of two or three bytes can be achieved with the instant invention by loading the bytes in the L, M or R registers, executing an SCL command and treating the contents of the least significant digit in the counter matrix (namely, the eight-bit register 20E) as the result. Inversion of an eight-bit byte can be accomplished by loading the byte in the L, M or R register, executing an SCL command, and treating the contents of the register 20E as the result. Since these two logical operations can be performed, any combinational function of Boolean variables may be generated.

The present invention has, then, general combinational logical processing capability of great versatility. It has also been shown to be convenient for logical processing. For example, suppose the bit-by-bit AND function of two bytes is desired. This can be accomplished by loading the bytes respectively in the L and M registers and executing an SCS command. The desired result is then obtained in the counter 20D. The ability to invert a byte for counting purposes makes it just as easy to perform $A\cdot\bar{B}$ as it is to form $A\cdot B$.

The temporary single-bit shift capability prior to counting eases the type of logical processing found in the "nearest neighbot" algorithms. For example, suppose the byte being processed is in the M register with its neighboring bytes in the L and R registers. The 10 bit registers described above provide storage space for the neighboring end bits also. Consider the $i^{th}$ bit, $M_i$. Suppose the AND of the neighbor above and to the left, $L_{111}$, with the neighbor below and to the right, $R_{i+1}$, is desired. That is, the result $P_i$ is to be given by:

$$P_i = L L_{111} \cdot R_{i+1} \text{ for } i = 0, 1, 2, \ldots 7.$$

This entire function can be accomplished with a single SCS command providing the L, M, and R registers are loaded with the desired operands.

As a further example consider a pattern recognition application such as a line-thinning operation. Such a job can be stated in terms of a thresholding operation. For example, consider the following processing criterion. A given bit in the unprocessed array has eight nearest neighbors. These nine bits are to be considered in determining the corresponding bit in the processed array. If seven or more of these nine bits are "ones" then make the processed bit a "one." Otherwise, the processed bit is to be made a "zero."This operation tends to make lines in the processed array two bits narrower than corresponding lines in the unprocessed array. It also moves stray "ones" and removes small holes.

This type of operation is cumbersome and time consuming on general-purpose computers. The instant system can perform this function and other thresholding problems quite conveniently. Briefly, the way thresholding is accomplished with the present apparatus is to count a bit and its eight nearest (i.e. surrounding) neighbors. This can be done for eight bits with three SCS commands once the unprocessed information is in the L, M and R registers. Then the counters are incremented by one. At this point, the eight processed bits are in register 20B.

Other thresholds can be obtained in a similar fashion. For some thresholds the ability to obtain the OR of several of the vertical counter registers on the information bus simplifies the job. One example is for a threshold of two when the count can range from zero to nine. After the neighbors are counted the OR of registers 20B, 20C, and 20D would represent the processed character.

As a final example consider another character recognition application. Perhaps the total number of ones in a digitized character array in storage is desired to help distinguish punctuation marks from alphabetic characters. The bytes of the array could be brought into the L, M and R registers three at a time. The ones in these bytes could be counted with one SCS command. After the array is all counted, or as often as necessary depending on counter length and array size, the total count could be obtained by summing the contents of the eight counters in a conventional binary adder. The individual counter contents can be presented, one at a time, by executing a loop consisting of all ITI command and an add command.

This apparatus and the ways in which it can be used provide a general logical processing capability, and a rapid and convenient means for accomplishing many commonly desired logical functions. Further, a wide variety of bit-processing tasks such as counting and thresholding can be done conveniently and rapidly. Processing speed can be increased by increasing the degree of parallelism employed.

Having thus described in detail a preferred embodiment of my invention, it will be apparent to persons skilled in the art that certain modifications may be made to the structure shown and that equivalent components may be substituted for those which have been described; and it is, therefore, intended that all such modifications and equivalents be covered as they are embraced within the spirit and scope of the appended claims.

I claim:

1. In a digital signal-processing system, the combination comprising: a plurality of temporary storage registers each for storing digital signals defining a byte; a plurality of digital counter circuits, each associated with a different bit location in a byte; command signal storage means for storing command signals; control circuit means responsive to said command signals for selecting the signal contents of predetermined ones of said temporary storage registers, said control circuit means including logic circuitry for a generating resultant signals representative of a predetermined logic function on the signal contents for each bit location of the selected storage registers in parallel; and first gating circuit means for gating said resultant signals to the inputs of associated ones of said counter circuits for storing said resultant signals.

2. The system of claim 1 wherein said temporary storage registers are shift registers including bit storage larger than a byte for shifting the signal contents thereof in a first and second direction and wherein said control circuit means further includes shifting circuit means responsive to other command signals in said command signal storage means to selectively shift the signal contents of selected ones of said shift registers in a first direction whereby said logic circuitry may operate on the shifted contents of said registers, then shifting the signal contents of each of said registers in a second direction to restore the signal contents of the selected shift registers to their original states, the results of said logic operations being stored in said counters.

3. The system of claim 1 further comprising output data bus means; first readout circuit means for selectively transferring the signal contents of a selected counter circuit to said data bus means; and second readout means for selectively transferring the signal contents of a selected bit location in all of said counter circuits to said data bus means.

4. The system of claim 3 wherein said second readout means includes a parallel data bus comprising a plurality of parallel lines; a temporary storage register for storing output gating signals; and output gating circuitry responsive to said output gating signals stored in said temporary storage register of said second readout means for selectively gating the signal contents of a selected bit location in all of said counter circuits to said parallel data bus.

5. The system of claim 2 wherein said command signal storage means includes shift specification signals and logic operations signals and said shifting circuitry includes time pulse generator means for generating time-spaced pulses and wherein said control circuit means includes second gating circuitry for transmitting a first-occurring timing pulse from said generator to shift the contents of said shift registers according to said shift specification signals, third gating circuitry responsive to said logic operation signals for transmitting a second-occurring timing pulse from said generator to enable said logic circuitry to receive the signal contents of said shift registers for operating thereon in parallel, and fourth gating circuitry for transmitting a third-occurring timing pulse from said generator according to said shift specification signals to shift the contents of said shift registers back to their original locations.

6. The system of claim 5 wherein said logic circuitry comprises OR gate means for each bit location of a byte for performing a conjunctive logic function on the contents of the selected shift registers in response to said second-occurring timing pulse and said logic operation signals of said command signal storage means, and means for transmitting output signals of said OR gate means to associated ones of said counter circuits.

7. The system of claim 5 wherein said control circuitry further includes fifth gating circuitry responsive to said logic operation signals and a second-occurring timing pulse and subsequently occurring timing pulses to sequentially transmit the signal contents of each of said selected shift registers to be transmitted to said logic circuitry for operating thereon in sequence; and sixth gating circuitry responsive to a final timing pulse to shift the contents of said registers according to said shift specification signals.

8. The system of claim 7 wherein said logic circuitry comprises second OR gate means for each bit location of a byte for performing a sequential conjunctive logic function on the contents of the selected shift registers and being enabled by said logic operation signals, and means for transmitting output signals of said second OR gate means to associated ones of said counters whereby said counters store accumulated counts of predetermined signals in said registers in parallel.

9. In digital signal-processing system, the combination comprising: a plurality of temporary storage registers each for storing digital signals defining a byte; a plurality of digital counter circuits, each associated with a different bit location in a byte; a command word register for storing command signals; control circuit means responsive to command signals in said command word register for selecting the signal contents of predetermined ones of said temporary storage registers, said control circuit means including logic circuitry for generating resultant signals representative of a predetermined logic function on the signal contents of the selected temporary storage registers; first gating circuit means for gating said resultant signals to the inputs of associated ones of said counter circuits for storing said resultant signals; output data bus means; first readout circuit means for selectively transferring the signal contents of a selected counter circuit to said data bus means; and second readout means for selectively transferring the signal contents of a selected bit location in all of said counter circuits to said data bus means.

10. The system of claim 9 wherein said temporary storage registers are shift registers including bit storage larger than a byte for shifting the signal contents thereof in a first and second direction and wherein the logic circuitry of said control circuit means is responsive to other command signals in said command word register to selectively shift the signal contents of each of said shift registers in a first direction then coupling the shifted contents of said registers to said logic circuitry for operating thereon, then shifting the signal contents, of each of said registers in a second direction to restore the signal contents of the selected shift registers to their original states, the results of said logic operations being stored in said counters.

11. In digital signal-processing system, the combination comprising: a plurality of temporary storage registers each for storing digital signals defining a byte; a plurality of digital counter circuits, each associated with a different bit location in a byte; a command word register for storing command signals; control circuit means responsive to command signals in said command word register for selecting the signal contents of predetermined ones of said temporary storage registers said control circuit means including sequential gating circuitry associated with each bit location of said temporary storage registers and responsive to signals in said command word register for sequentially detecting predetermined signals in an associated bit location for preselected ones of said temporary storage registers; second gating means for each bit location coupling the output signals of said sequential gating circuitry to a countercircuit associated with that bit location; output data bus means; first readout circuit means for selectively transferring the signal contents of a selected countercircuit to said data bus means; and second readout means for selectively transferring the signal contents of a selected bit location in all of said countercircuits to said data bus means.

12. The system of claim 11 wherein said temporary storage registers are shift registers including bit storage larger than a byte for shifting the signal contents thereof in a first and second direction and wherein the logic circuitry of said control circuit means is responsive to other command signals in said command word register to selectively shift the signal contents of each of said shift registers in a first direction then coupling the shifted contents of said registers to said logic circuitry for operating thereon, then shifting the signal contents of each of said registers in a second direction to restore the signal contents of the selected shift registers to their original states, the results of said logic operations being stored in said counters.

13. The system of claim 12 wherein said second readout means includes a parallel data bus comprising a plurality of parallel lines; a temporary storage register for storing output gating signals; and output gating circuitry responsive to said output gating signals stored in said temporary storage register of said second readout means for selectively gating the signal contents of a selected bit location in all of said counter circuits to said parallel data bus.